United States Patent [19]
Bach

[11] Patent Number: 6,019,435
[45] Date of Patent: Feb. 1, 2000

[54] WHEEL HUB WITH A SUSPENSION AND A USE OF SUCH WHEEL HUB

[76] Inventor: Jens Bilgrav Bach, Skovgaardsparken 10, DK-7080 Børkop, Denmark

[21] Appl. No.: 09/051,858

[22] PCT Filed: Oct. 23, 1996

[86] PCT No.: PCT/DK96/00444

§ 371 Date: Apr. 23, 1998

§ 102(e) Date: Apr. 23, 1998

[87] PCT Pub. No.: WO97/15461

PCT Pub. Date: May 1, 1997

[30] Foreign Application Priority Data

Oct. 23, 1995 [DE] Germany .................................. 1189/95

[51] Int. Cl.[7] ...................................................... B60B 27/00
[52] U.S. Cl. ................................ 301/105.1; 280/124.177
[58] Field of Search ........................... 301/110.5, 105.11; 280/124.177

[56] References Cited

U.S. PATENT DOCUMENTS

| | | | |
|---|---|---|---|
| 1,457,538 | 6/1923 | Mark et al. ........................... | 301/105.1 |
| 3,072,169 | 1/1963 | Hastings, Jr. . | |
| 4,294,491 | 10/1981 | Black ................................... | 301/105.1 |
| 4,295,686 | 10/1981 | Black ................................... | 301/105.1 |
| 4,602,822 | 7/1986 | Kim et al. ............................ | 301/105.1 |
| 4,755,005 | 7/1988 | Tsai ..................................... | 301/105.1 |

FOREIGN PATENT DOCUMENTS

| | | | |
|---|---|---|---|
| 1332032 | 6/1963 | France ................................ | 301/105.1 |
| 53954 | 7/1932 | Norway . | |
| 4660 | of 1898 | United Kingdom ................ | 301/110.5 |
| 1740 | of 1911 | United Kingdom ................ | 301/105.1 |

*Primary Examiner*—D. Glenn Dayoan
*Assistant Examiner*—Long Bao Nguyen
*Attorney, Agent, or Firm*—Watson Cole Grindle Watson, P.L.L.C.

[57] ABSTRACT

A wheel hub with suspension includes a carrier arm, a swivel axle and a hub body rotatably secured to the swivel axle. A resilient element is positioned between the carrier arm and the swivel axle. A load on the wheel or the hub body will cause the swivel axle to be displaced relative to the carrier arm, whereby the resilient element is deformed and exercises its resilient effect. The wheel hub may be used in many different applications and for many different types of wheels, such as wheels on vehicles, driving wheels, and support wheels.

14 Claims, 10 Drawing Sheets

WHEEL HUB WITH A SUSPENSION AND A USE OF SUCH WHEEL HUB

BACKGROUND OF THE INVENTION

1. Field of the Invention

The present invention relates to a wheel hub with a suspension of the type known from U.S. Pat. No. 3,072,169 and NO 53954, which describe wheel hubs which are fastened by one or more fastening elements to a body that is to be relieved of shocks and other pulsating loads, preferably a vehicle, the hub including a swivel axle around which a hub body is rotatably seated, a remaining part of a wheel construction being intended to be fastened to the hub body, and a resilient element being positioned between the fastening elements and the hub body.

2. The Prior Art

U.S. Pat. No. 3,072,169 describes a resilient wheel which includes a hub and a wheel structure. The hub is divided into a non-resilient part and a resilient part, and the wheel structure is mounted on the resilient part. The suspension of the wheel structure is such that the non-resilient part and the resilient part are mutually connected by elastic members which allow a mutual displacement of the hub and the wheel structure.

However, this resilient wheel described in this patent has disadvantages. The wheel constitutes an integral structure and may only with much difficulty be used for different applications. Furthermore, both the part that is non-resilient and the part that is resilient must be constructed in such a manner that the elastic members may be fastened to these parts. The non-resilient part and its mass are very big, which reduces the resilience. Finally, the wheel guidance and steering are very unstable and ambiguous, both in horizontal and in vertical direction as the elastic elements are part of the guidance and steering of the wheel.

NO 53954 describes a wheel hub which is resilient and which includes a hub that is hollow and an axle that extends through the hub. The axle is intended to be fastened to a body to be suspended and the hub is rotatably seated around the axle. A turning spring is mounted between the hub and the axle. In a resting position, a centre of the hub is positioned vertically below the axle. In a situation under load, the hub will swing upward and simultaneously swing forward or backward.

This resilient hub described in the above-mentioned publication has several important disadvantages. The geometry of the resilience is not well-defined. It is not possible to determine whether the hub will swing forward or backward in a situation under load. This means that it is not possible to establish any steering properties. In a situation under load, there is further a risk of overloading the hub so that no resilience occurs because the hub is loaded to an extreme position. In a situation under load, the hub will further perform a swinging movement around the axle, which movement will consist of a vertical contribution and a horizontal contribution having the same size as the vertical contribution. This further reduces any steering geometry considerably. Finally, a moment load on the axle will occur when mounted on applications to be suspended, and possibilities of using different resilient elements are limited.

It is the object of the present invention to provide the possibility of providing resilience for a wheel by means that do not possess the above-mentioned disadvantages and consequently have a small non-resilient mass and establish stable steering, and which may at the same time be used in many applications.

SUMMARY OF THE INVENTION

This object is obtained by a resilient wheel hub that is characterised in that the carrier arm includes a first bearing, that the first bearing extends coaxially with the swivel bearing of the swivel axle, that a bearing pin extends through both the swivel bearing of the swivel axle and the first bearing of the carrier arm, that the carrier arm constitutes a fork, that the fork includes at least one fork branch, and that the fork branch includes the first bearing.

A wheel hub with these characteristics means that the design of the remaining part of the wheel structure that is to be relieved of shocks and other pulsating loads is entirely independent of the present invention.

Thus, the present invention may be used in combination with wheels for vehicles such as bicycles, wheelchairs, hospital beds, trolleys, etc. The present invention may also be used in combination with rollers, e.g. for conveyor belts, or in combination with transmission systems of different types, e.g. belt drives.

The invention is particularly advantageous in that the non-resilient mass is very small. The non-resilient mass is only composed of the swivel axle, the hub body, any bearings, and part of the resilient element. The carrier arm with fastening elements form part of the resilient mass as the carrier arm and the fastening elements are secured to the body to be suspended.

The invention may be used with one fastening element or two fastening elements that extend outwardly from the carrier arm in order to be fastened to the body to be suspended. The fastening element may be constituted by different types of fastening means, preferably a bolt. Alternatively, the fastening element may be a different form of screw connection, a through-going axle with a spring lock or other means.

The resilient element may be of different types. Thus, it may be a solid, resilient element such as a rubber member or a turning spring. It may also be a viscous element such as a hydraulic or pneumatic dampening element. A combination of elements is also possible in order to combine characteristics of the different types of elements, such as a combination of a rubber member and a spring. The rubber member has a certain self dampening and typically has a progressive character, whereas the resilient character of a turning spring is linear and has little self dampening.

It will further be possible, e.g. with hydraulic or pneumatic suspension, to adjust the resilience by making it possible, in a flexible container, to adjust the amount of the liquid or the gas which is contained in the flexible container and which establishes the resilience. The flexible container may alternatively contain a specific amount of liquid or gas, which amount is in connection with an external flexible container.

The carrier arm is mounted on the swivel axle by means of a bearing peg extending through a first bearing in the carrier arm and through a swivel bearing in the swivel axle. The carrier arm may be a fork with two fork branches and a fork head. If the swivel bearing in the swivel axle extends along it in the entire extension of the swivel axle, the fork branches will extend on either side of the swivel bearing and thus on either side of the swivel axle, and the fork head will extend parallel with the swivel axle and connect the two fork branches on either side of the swivel axle. If the swivel bearing in the swivel axle extends over a lesser extension of the swivel bearing, the fork branches will still extend on either side of the swivel bearing in the swivel axle but this is necessarily not so over the entire extension of the swivel axle.

The hub body is preferably rotatably seated around the swivel axle by means of one or several ball bearings. It will also be possible to use other types of bearings such as roller bearings or plain bearings. As mentioned, the hub body may constitute the hub of many different types of wheels. They may be wheels having a fixed wheel disc as well as wheels having spokes.

DESCRIPTION OF THE DRAWING

The invention will now be described in further detail with reference to the accompanying drawing, wherein.

DETAILED DESCRIPTION OF THE PREFERRED EMBODIMENTS

Figure 1A:
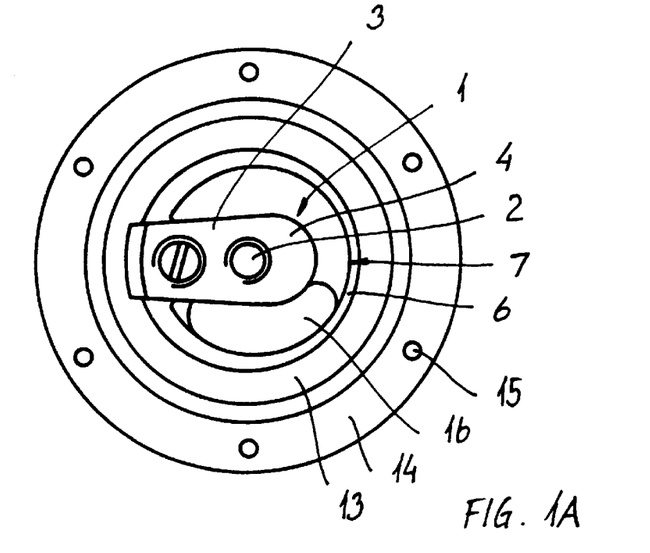
FIGS. 1A and 1B are, respectively, a plan view parallel to an axis of a hub and a partial sectional view perpendicular to an axis of a hub of a first embodiment of a hub according to the invention.
Figure 1B:
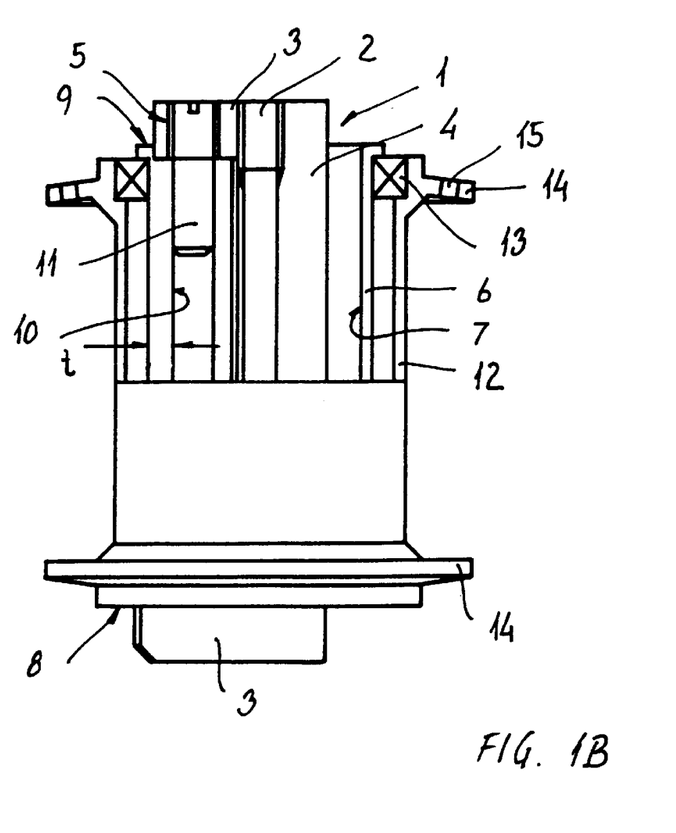

FIG. 1A and FIG. 1B illustrate an embodiment of a hub according to the invention. The shown embodiment of the hub is intended for use in a wheel with spokes (not shown). The hub includes a carrier arm 1 provided with a threaded hole 2 for mounting a fastening element such as a screw element (not shown). The fastening elements are intended for fastening the hub to a body to be suspended. The carrier arm constitutes a fork with fork branches 3 and a fork head 4. The fork branches 3 are provided with first bearings 5 or alternatively threaded for the mounting of a guiding pin. The hub further includes a swivel axle 6. The swivel axle 6 in the embodiment shown constitutes a cylinder and is hollow having an inner periphery 7. The fork head 4 of the carrier arm 1 extends parallel with an axis A of the hub through the swivel axle 6 within the inner periphery 7. The fork branches 3 extend on a first side 8 and a second side 9, respectively, of the swivel axle 6.

The swivel axle 6 is provided with a swivel bearing 10. A bearing pin 11, or alternatively a bearing peg, extends parallel with the axis A of the hub through the first bearings 5 in the fork branches 3 and through the swivel bearing 10 in the swivel axle 6. The swivel axle 6 has a thickness t of material that is largest around the swivel bearing 10 in order to give increased strength around the swivel bearing 10. A hub body 12 is rotatably seated around the swivel axle by means of ball bearings 13. The hub body 12 in the embodiment shown also constitutes a cylinder. The hub body 12 includes a flange 14 with holes 15 for mounting spokes (not shown) to build a wheel, e.g. for a bicycle or a wheelchair.

A resilient element 16 in the form of a rubber member is positioned between the carrier arm 1 and the inner periphery 7 of the swivel axle 6. In the situation shown, the hub is loaded, and the rubber member 16 is consequently deformed corresponding to a resilient effect on the body (not shown) to which the hub, by means of the carrier arm in the hub, is intended to be fastened and which is to be suspended.

Figure 2A:
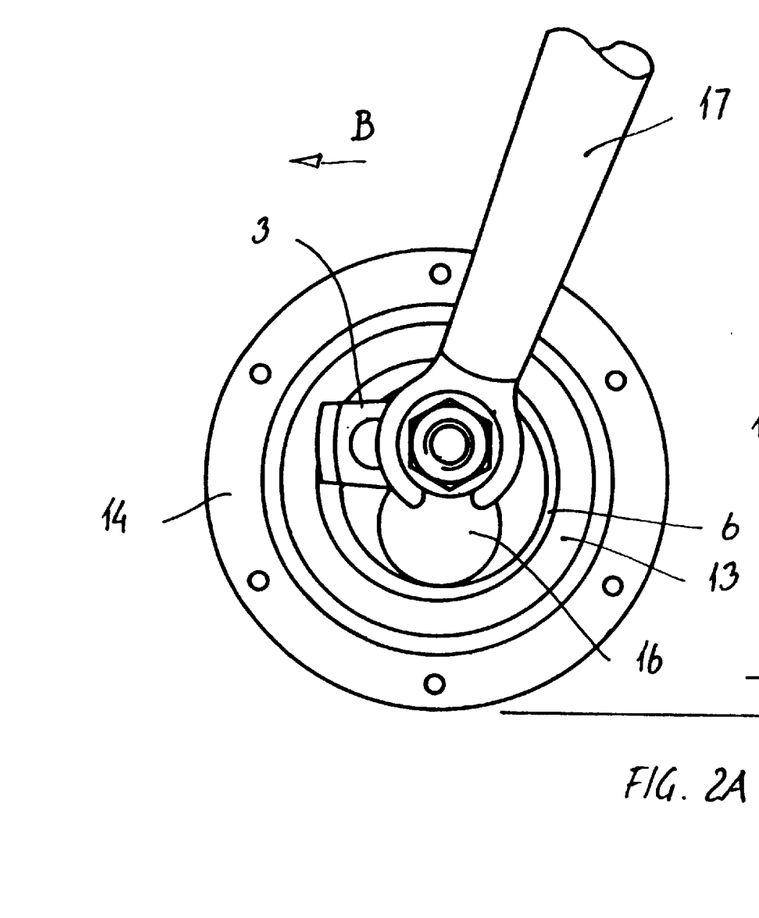
FIGS. 2A and 2B are plan views parallel to the axis of the hub, the hub being mounted in a front fork of a bicycle in a first unloaded situation and a second loaded situation.
Figure 2B:
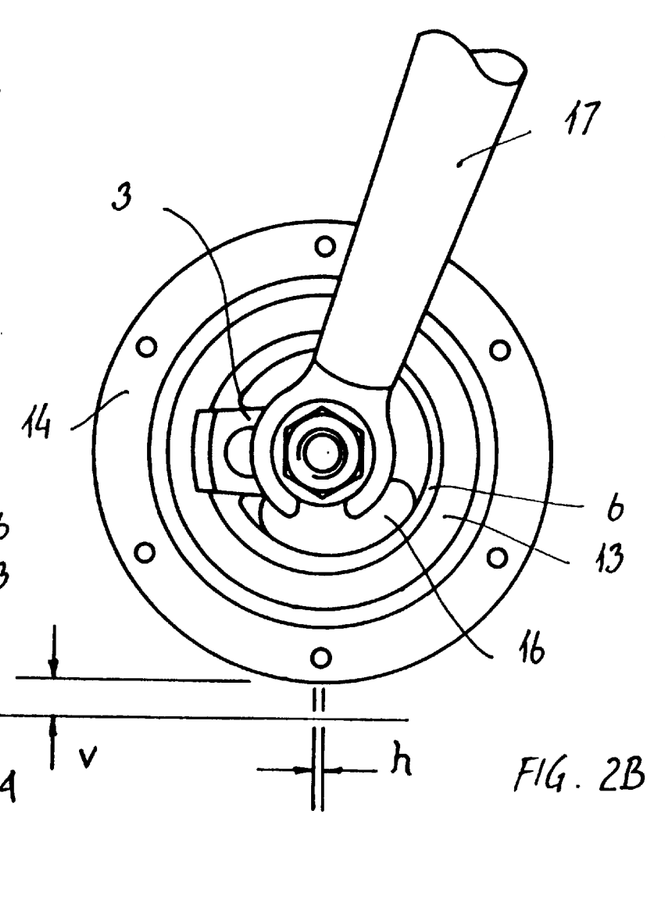

FIG. 2A and FIG. 2B illustrate a hub such as illustrated and described in the preceding figures, mounted in a front fork 17 of a bicycle. FIG. 2A illustrates a first unloaded situation of the hub and FIG. 2B illustrates a second loaded situation of the hub.

In the first unloaded situation the rubber member 16 positioned between the carrier arm 1 and the inner periphery 7 of the swivel axle 6 is undeformed corresponding to the wheel and consequently the hub not being loaded either by a cyclist on the bicycle or by a roughness on the ground.

In the second loaded situation the rubber member 16 is deformed corresponding to a cyclist sitting on the bicycle and/or the wheel passing a roughness on the ground. Compared to the situation illustrated in FIG. 2A, the front fork 17 and the carrier arm 1 are in the same position. However, the swivel axle 6, the hub body 12, the ball bearings 13 and partly the rubber member 16 are displaced as a consequence of the load and thus constitute the non-resilient mass of the hub.

The figures illustrate that the swivel axle is displaced relative to the carrier arm during a resilient movement. The displacement consists of both a horizontal displacement h and a vertical displacement v. The vertical displacement v is dependent on the size of the load to which the wheel and the hub are exposed. The displacement is further dependent on the dimensions of the individual parts of the hub, on the mutual geometric relations between the individual parts of the hub as well as the type of resilient element used. In the illustrated embodiment, which is a hub intended for an ordinary bicycle wheel, the vertical displacement v will be in a range up to 6 mm when a rubber member is used as resilient element. Likewise, the horizontal displacement h is dependent on the load to which the wheel and the hub are exposed, on the dimensions of the individual parts in the hub, on the mutual geometric relations between the individual parts of the hub as well as on the type of resilient element used. The horizontal displacement h consists in a displacement backward relative to the driving direction B of the bicycle. The size of the horizontal displacement h, however, is very limited and in the case of an ordinary bicycle wheel and hub will be in a range up to one fourth of the vertical displacement v, i.e. up to 1.6 mm, when a rubber element is used as resilient element.

Figure 3A:
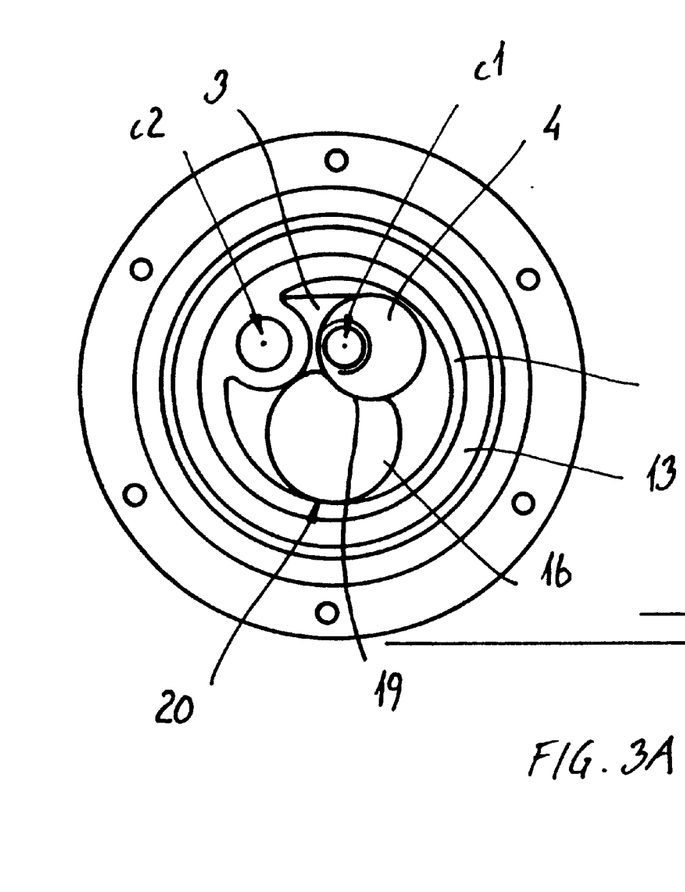
FIGS. 3A and 3B are sectional views perpendicular to the axis of the hub in the first unloaded situation and the second loaded situation.
Figure 3B:
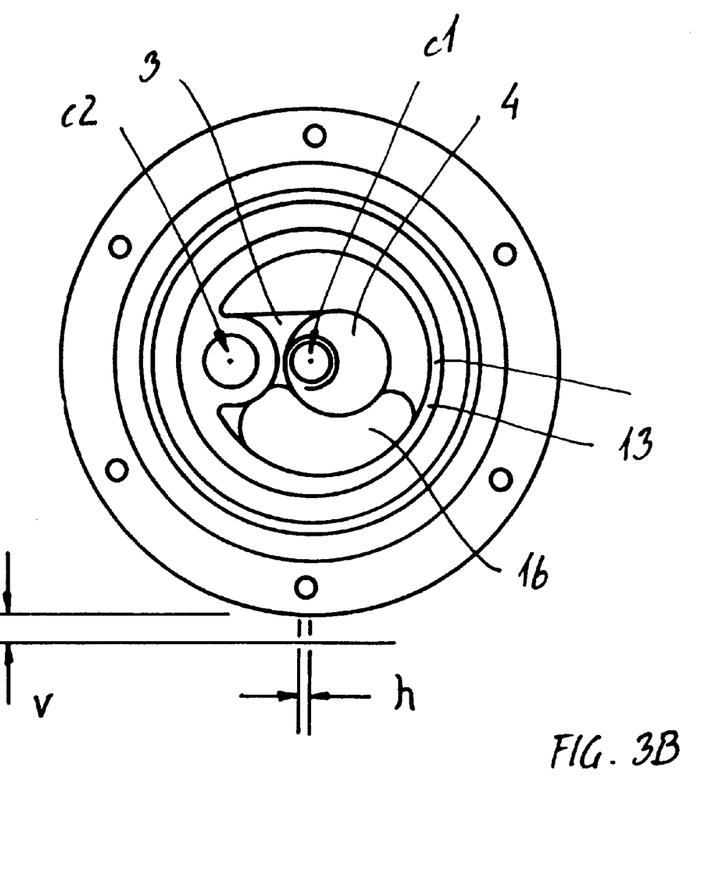

FIG. 3A and FIG. 3B illustrate the same two situations as in FIG. 2A and FIG. 2B, an unloaded situation and a loaded situation of the hub, respectively. The fork head 4, which is part of the carrier arm 1, is illustrated in the sectional view. The rubber member 16 contacts a lowest side 19 of the fork head 4 and a lowest surface 20 of the inner periphery 7 of the swivel axle 6.

It is seen, as mentioned, that the carrier arm 1 does not change its position when the hub is loaded. Thus, a centre cl of the fastening of the fastening elements (not shown) to the front fork 17 (see FIGS. 2A and 2B) and a centre c2 of the first bearing in the fork branches 3, respectively the swivel bearing 10 in the swivel axle 6 (see FIGS. 1A and 1B), do not change their positions when the hub is loaded. The swivel axle 6, the hub body 12, the ball bearings 13 and partly the rubber member 16, on the contrary, do change their positions, as mentioned, and thus constitute the non-resilient mass of the hub.

Figure 4A:
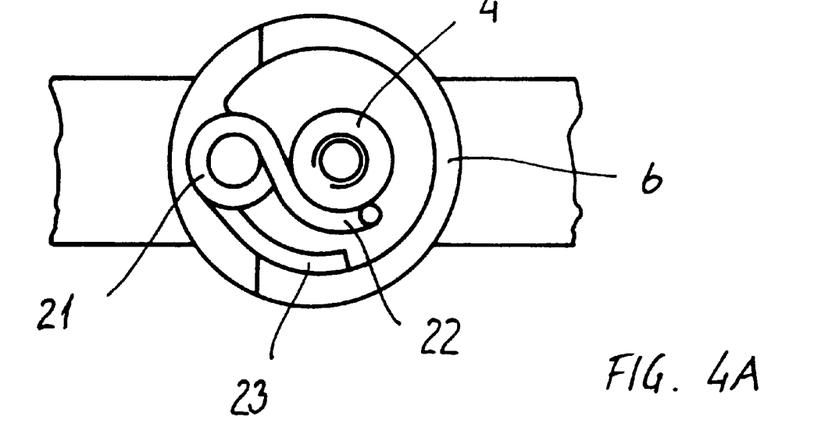
FIGS. 4A and 4B are, respectively, a sectional view perpendicular to the axis of the hub, and a partial sectional view parallel to the axis of the hub of an alternative embodiment of a hub according to the invention.
Figure 4B:
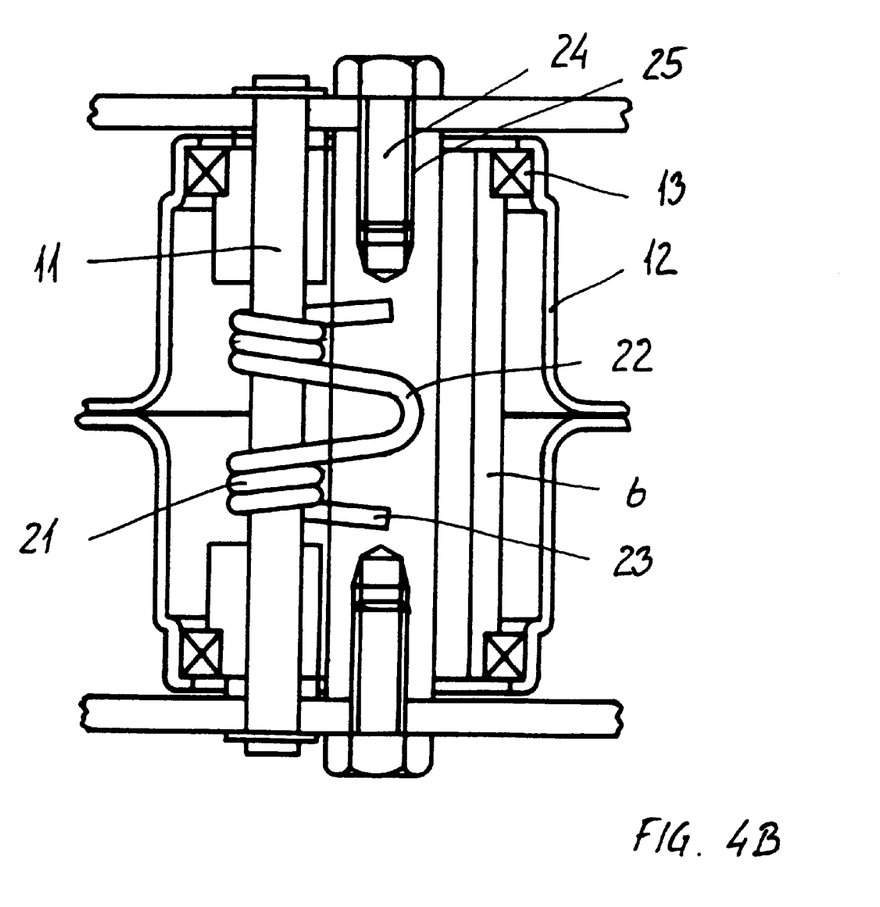

FIG. 4A and FIG. 4B illustrate an alternative embodiment of a hub according to the invention. The difference is that the rubber member 16 as the resilient element has been replaced by a turning spring 21. The turning spring 21 is mounted around the bearing pin 11 extending through the first bearings 5 in the fork branches 3 and through the swivel bearing 10 in the swivel axle 6. A first part 22 of the turning spring 21 contacts the lowest side 19 of the fork head 4 of the carrier arm 1. and a second part 23 contacts the lowest side 20 of the inner periphery 7 of the swivel axle 6. In the embodiment shown, the fastening elements consist of screws 24, which form part of the body to be suspended. The screws 24 extend into a thread 25 in the fork head 4 of the carrier arm 1. As an alternative to the screws 24, a bolt or an unthreaded transverse pin may be used.

Figure 5A:
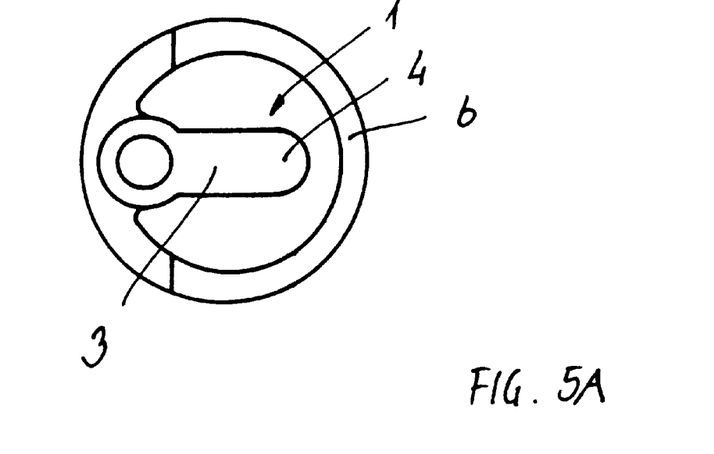
FIGS. 5A and 5B are a sectional view perpendicular to the axis of the hub, respectively a sectional view parallel to the axis of the hub of a second embodiment of a hub according to the invention.
Figure 5B:
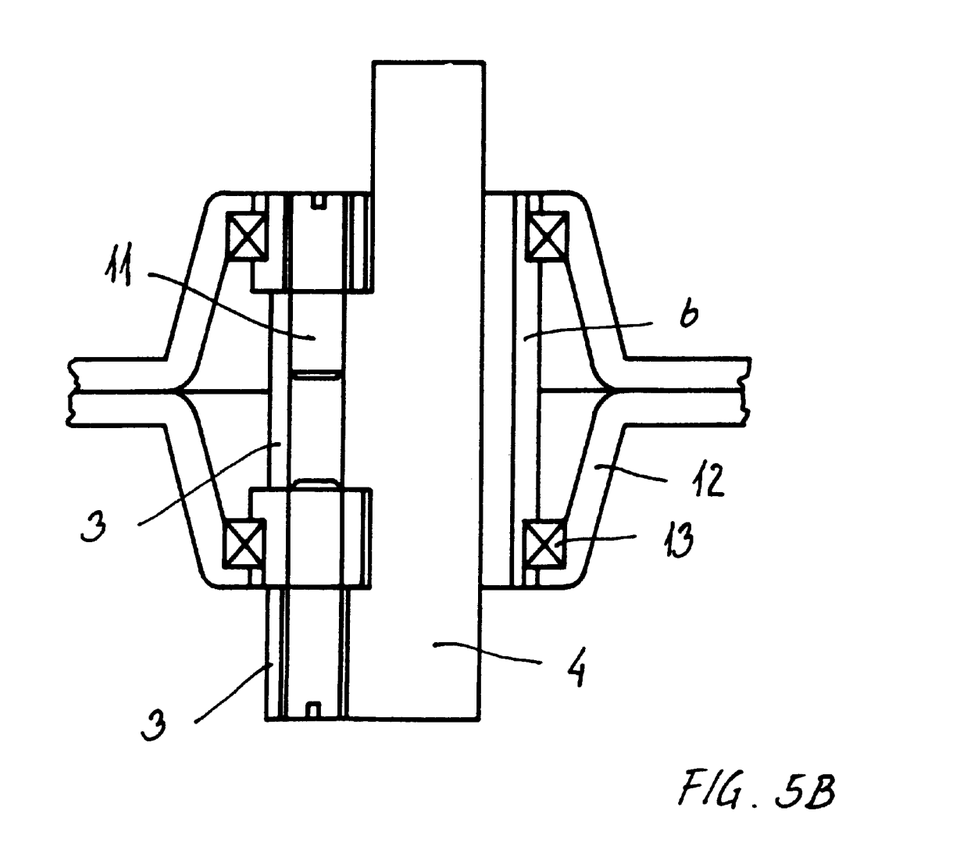

FIG. 5A and FIG. 5B illustrate a second embodiment of a hub according to the invention. Like the hub illustrated in the preceding figures, the hub consists of a carrier arm 1, a swivel axle 6, a bearing pin 11, a hub body 12 and ball bearings 13. The carrier arm 1 in the embodiment shown likewise constitutes a fork having a fork head 4 and fork branches 3. The swivel axle 6 is also hollow, and the fork head 4 also extends parallel with the axis A of the hub through the swivel axle 6 inside the inner periphery 7. The fork branches 3, however, extend on a first side 8 of the swivel axle 6 and between swivel bearings 10 that extend along the inner periphery 7 of the swivel axle 6. Thus, the fork branches 3 do not occupy any space at the second side 9 of the swivel axle 6. Alternatively, the carrier arm 1 might comprise a single fork branch 3 extending between the swivel bearings 10 so that the fork branches do not occupy any space at the first side 8 nor at the second side 9 of the swivel axle 6. The term fork branch is kept for this alternative embodiment irrespective of the fact that in principle a fork comprises at least two branches.

Figure 6A:
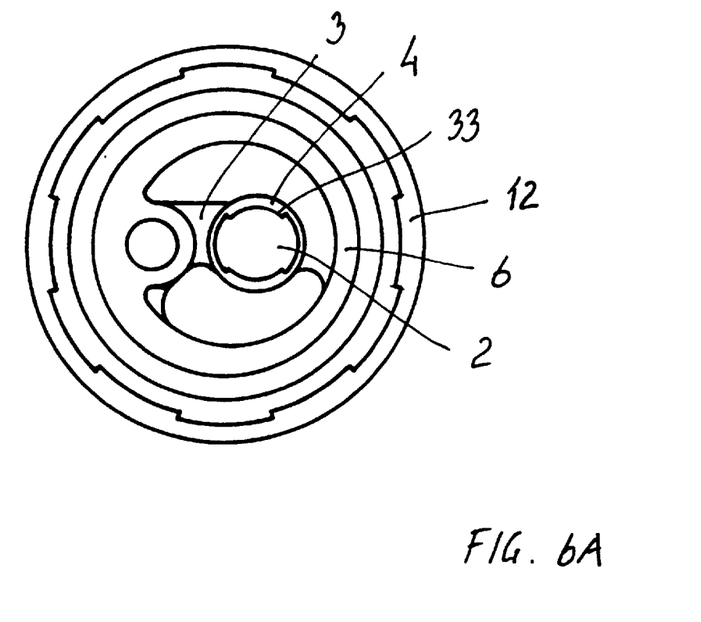
FIGS. 6A and 6B are, respectively, a sectional view perpendicular to the axis of the hub, respectively a sectional view parallel to the axis of the hub of a third embodiment of a hub according to the invention.
Figure 6B:
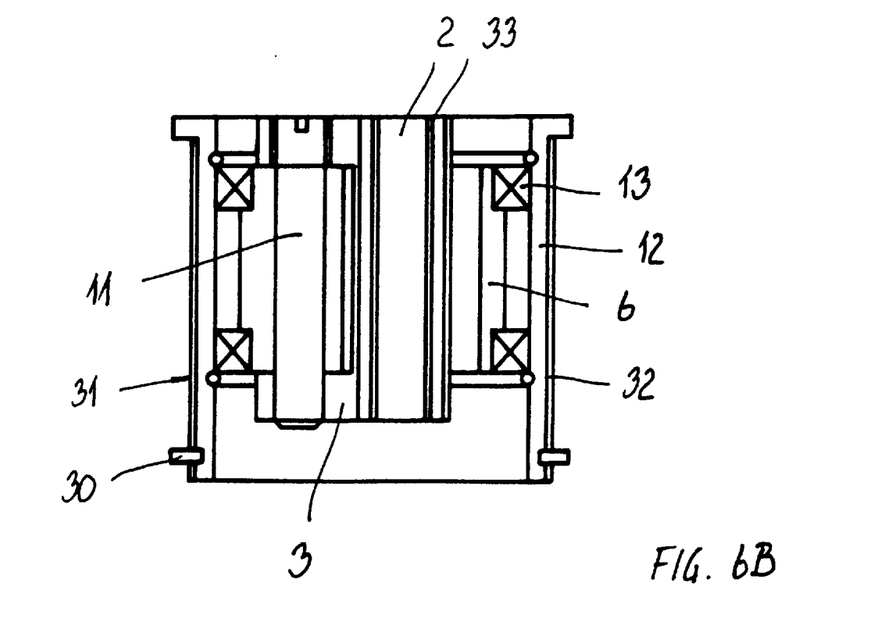

FIG. 6A and FIG. 6B illustrate a third embodiment of a hub according to the invention. The hub illustrated in FIG. 6A and FIG. 6B is substantially identical to the hub illustrated in FIGS. 1A–1B. The difference is that the hub body 12 extends in axial direction past the fork branch 3, which extends along the first side 8 of the swivel axle 6. This embodiment is suitable for one-sided fastening, only the fork branch 3 extending along the second side 9 of the swivel axle 6 being intended for fastening to the body to be suspended. The hub is provided with a locking ring 30. A wheel (not shown) may be inserted around the hub body 12 and be fastened to the hub by means of the locking ring 30. The hub body 12 has an outer side 31 provided with a tooth gearing 32 in order to establish a mesh between a wheel and the hub. The hub illustrated in FIG. 6A and FIG. 6B may, for example, be used for wheelchairs. In the embodiment shown the threaded hole 2 has been replaced by a hole 2 that constitutes a bearing, e.g. for an axle (not shown) of a spring lock, the axle being fastened to the body to be suspended. The hole 2 constituting a bearing for the axle is provided with a tooth gearing 33. If the axle is provided with a cross-section corresponding to the hole 2, the tooth gearing 33 of the hole 2 will prevent a rotation of the carrier arm 1 in relation to the axle, and consequently in relation to the body to be suspended.

Figure 6C:
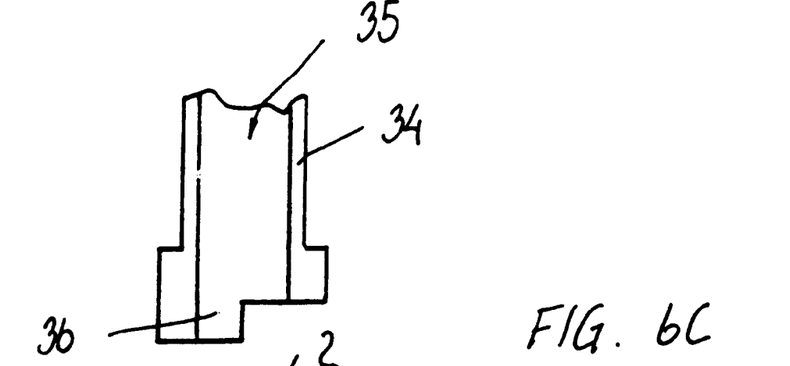
FIGS. 6C and 6D are, respectively, a sectional view of a sleeve and a sectional view parallel to the axis of the hub of an alternative third and preferred third embodiment of a hub according to the invention.
Figure 6D:
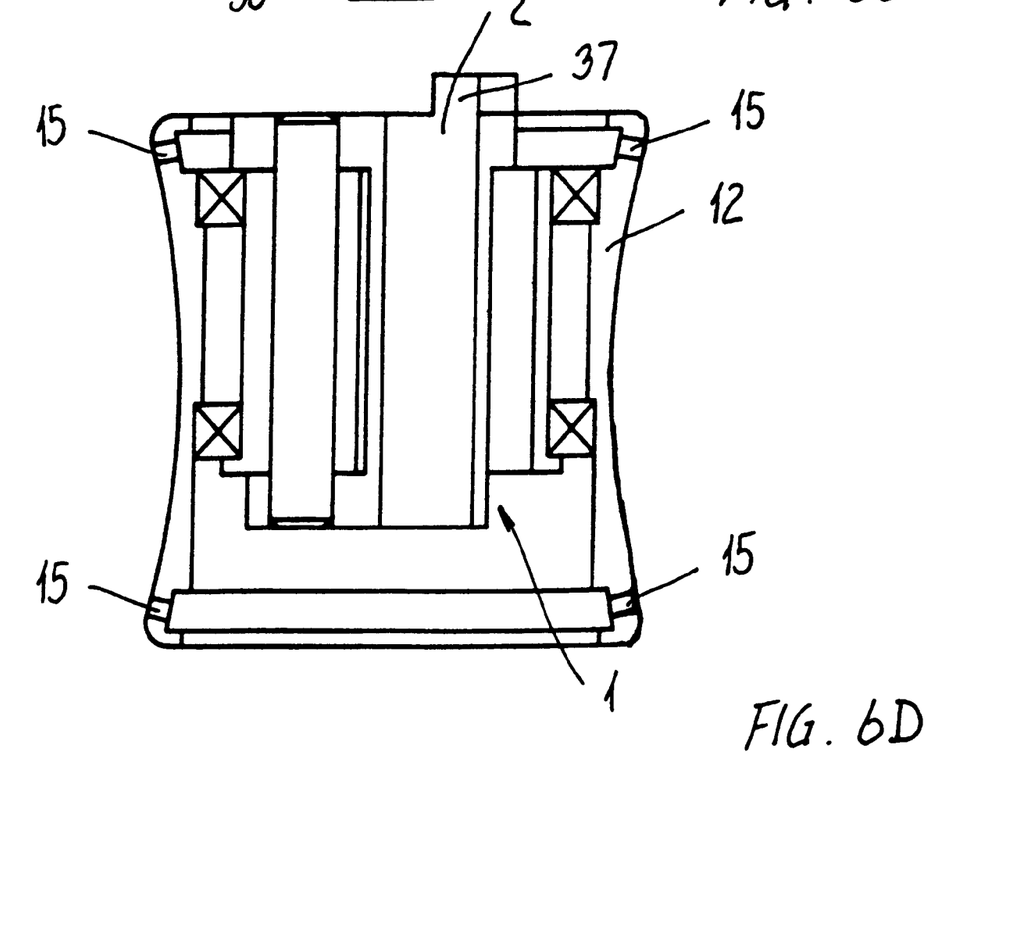

FIG. 6C and FIG. 6D illustrate a sleeve 34 and an alternative third and preferred embodiment of a hub according to the invention. The sleeve 34 is intended to extend inwardly in the body to be suspended. The sleeve 34 is provided with a hole 35 through which an axle (not shown) may extend. The sleeve 34 is further provided with a collar 36. The carrier arm 1 on the sleeve is provided with a corresponding collar 37. An axle (not shown) intended to extend through the hole 35 in the sleeve 34 is also intended to extend through the hole 2 in the carrier arm 1. Holes 15 for spokes (not shown) are provided in the hub body 12 itself as an alternative to providing holes for spokes in a flange 14 (see FIG. 1A and FIG. 1B among others). The sleeve 34 and the hub illustrated respectively in FIG. 6C, FIG. 6D, may also be used for wheelchairs. The collar 37 on the carrier arm 1 is intended to be in mesh with the collar 36 on the sleeve 34. The mutual mesh of the collar 37 on the carrier arm 1 and the collar 36 on the sleeve 34 prevent a rotation of the carrier arm 1 in relation to the axle (not shown), and consequently also in relation to the body to be suspended.

Figure 7A:
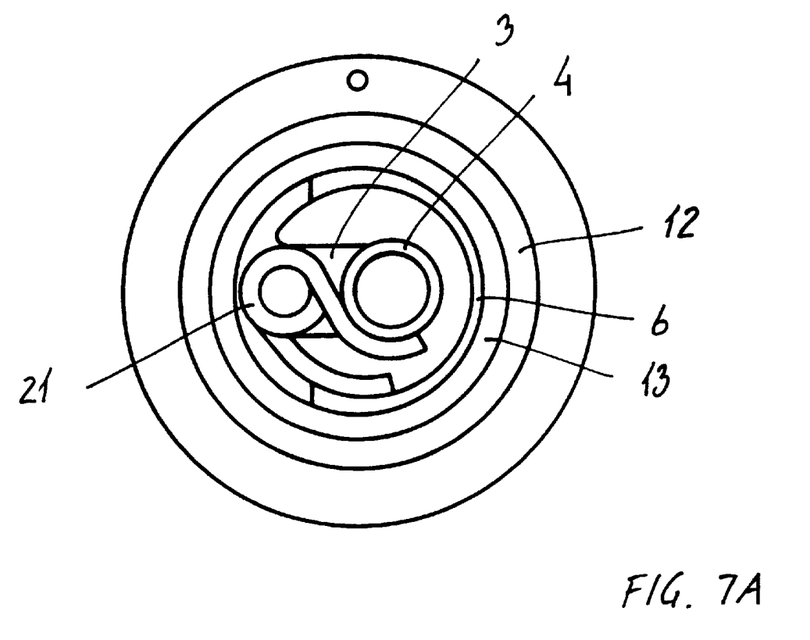
FIGS. 7A and 7B are, respectively, a sectional view perpendicular to the axis of the hub, and a sectional view parallel to the axis of the hub of a fourth embodiment of a hub according to the invention.
Figure 7B:
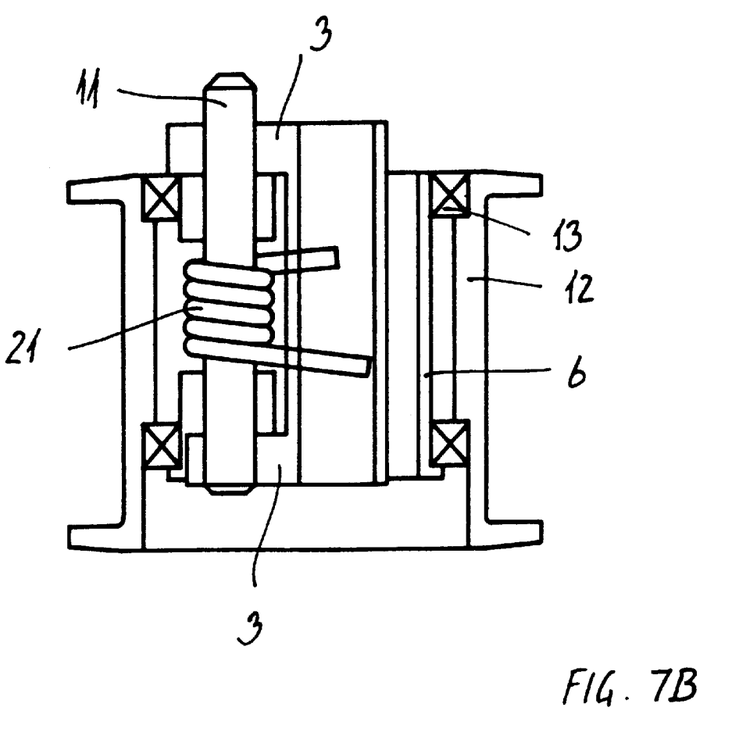

FIG. 7A and FIG. 7B illustrate a fourth embodiment of a hub according to the invention. The resilient element 16 in this embodiment is a turning spring 21. Part of the bearing pin 11 extends past the fork branches 3 in the embodiment shown. The part of the bearing pin 11 extending past the fork branches 3 is intended to extend inward in a hole (not shown) in the body to be suspended. The bearing pin 11 will prevent a rotation of the carrier arm 1 in relation to an axle (not shown) that extends through the hole 2, and thus in relation to the body to be suspended.

Figure 8A:
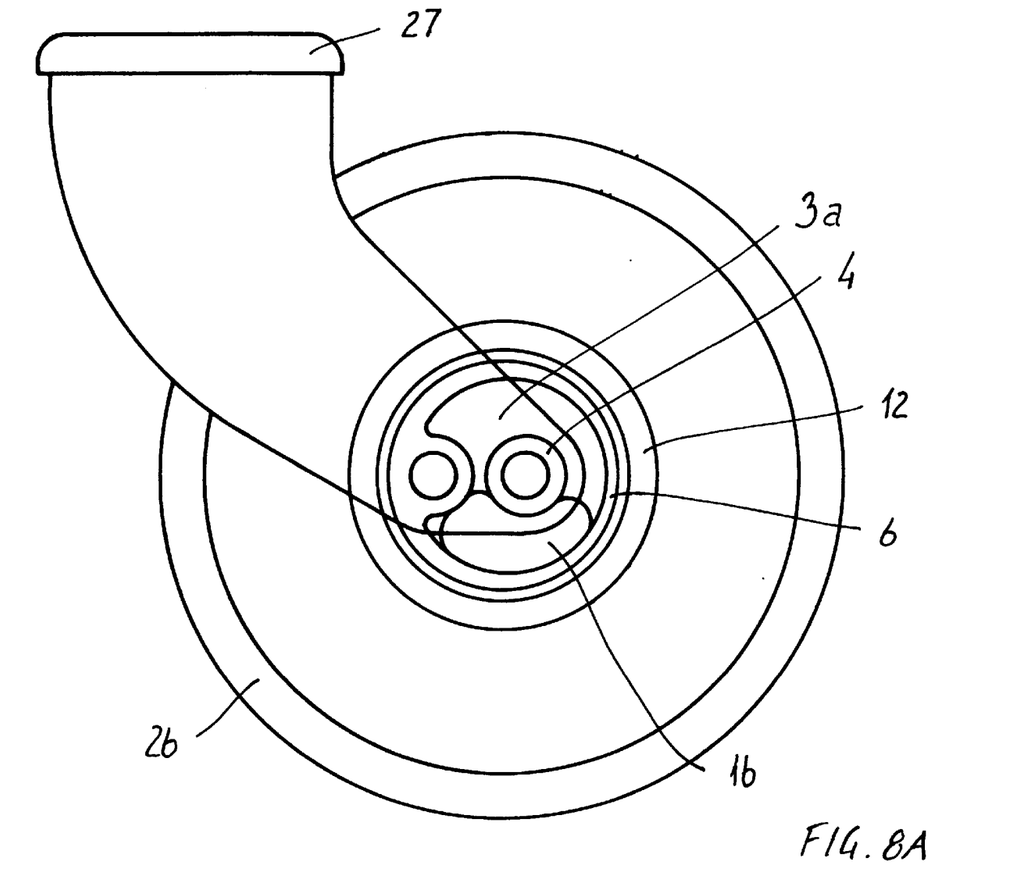
FIG. 8A and FIG. 8B are, respectively, a plan view parallel to the axis of the hub, and a sectional view parallel to the axis of the hub of a fifth embodiment of a hub according to the invention.
Figure 8B:
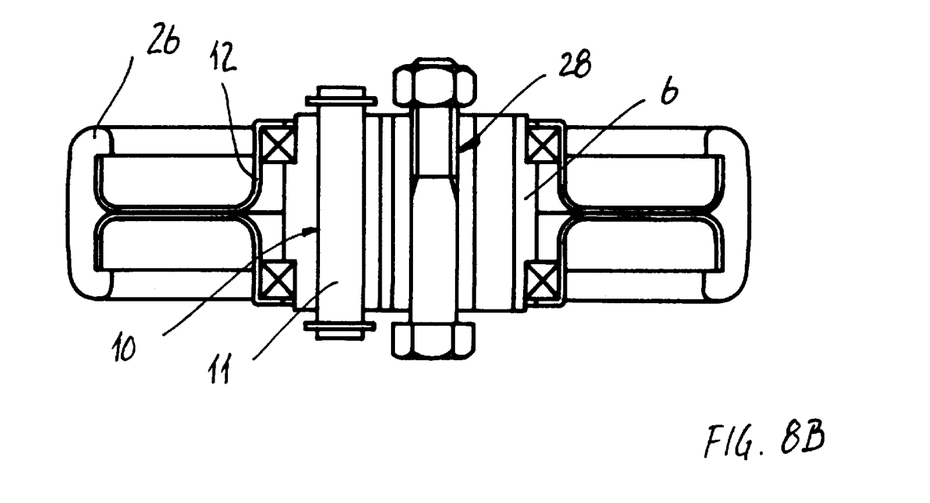

FIG. 8A and FIG. 8B illustrate a fifth embodiment of a hub according to the invention. In the embodiment shown the hub is fastened to a trolley wheel, which forms part of the body to be suspended. The hub comprises the carrier arm 1, the swivel axle 6, the swivel bearing 10, the ball bearings 13 and the hub body 12. The hub body with a tread 26 in the embodiment shown constitutes the actual wheel of the trolley. The carrier arm 1 in the embodiment shown is composed of the fork head 4, and the fork branches 3 are formed by struts extending to a pivot joint 27 on the trolley. By means of a bolt 28 extending through the fork head 4, the fork head 4 is fastened to the struts 3a, which form the fork branches. A bearing pin 11 extends from the struts 3a through the pivot joint 10 along the inner periphery 7 of the swivel axle 6.

Figure 9A:
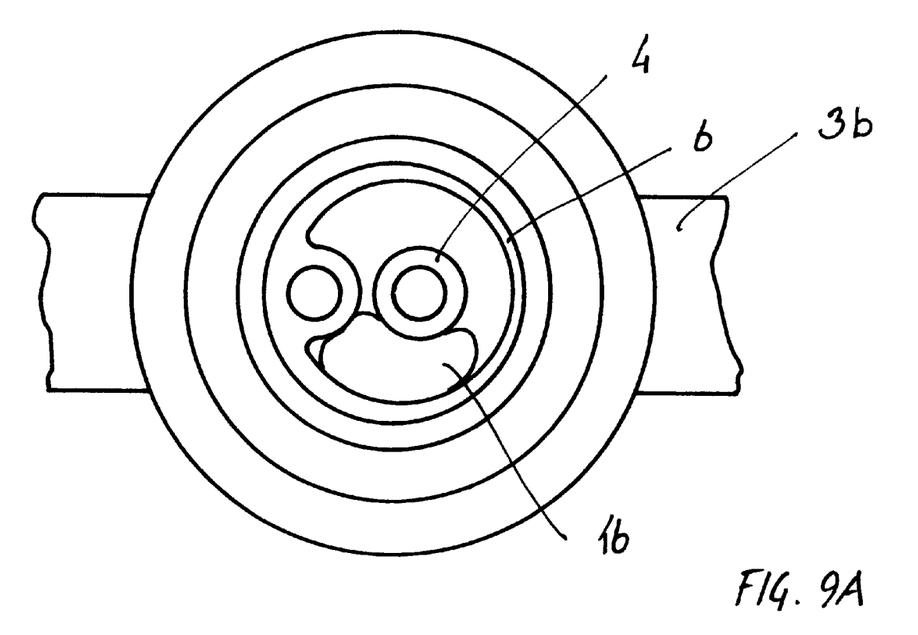
FIGS. 9A and 9B are, respectively, a sectional view perpendicular to the axis of the hub, and a sectional view parallel to the axis of the hub of a sixth embodiment of the hub according to the invention.
Figure 9B:
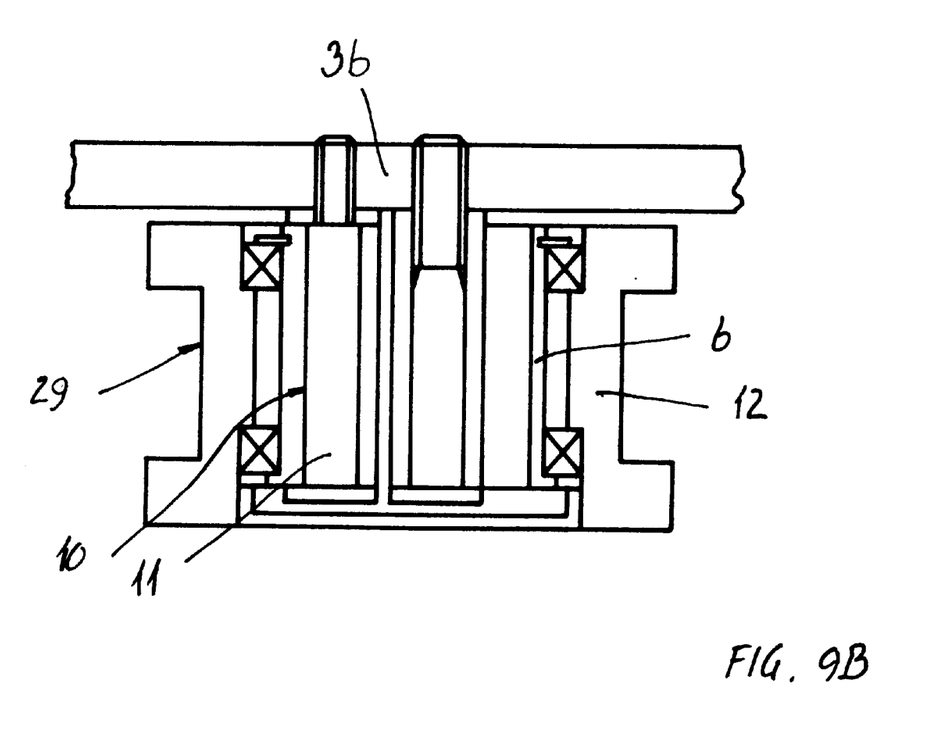

FIG. 9A and FIG. 9B illustrate a sixth embodiment of the invention. In the embodiment shown the hub is fastened to a roller, e.g. for a belt drive, which forms part of the body to be suspended. The hub includes the carrier arm 1, the swivel axle 6, the swivel joint 10, the ball bearings 13 and the hub body 12. The hub body in the embodiment shown constitutes the actual roller, which is provided with a track 29. The carrier arm 1 in the embodiment shown is composed of the fork head 4, and the fork branch 3 is formed by carrier element 3b of the roller. By means of a bolt 28 extending through the fork head 4, the fork head 4 is fastened to the carrier element 3b, which constitutes the fork branches. A bearing pin 11 extends from the carrier element 3 through the swivel bearing 10 along the inner periphery 7 of the swivel axle 6.

The wheel hub according to the invention in the embodiments shown is illustrated with reference to specific embodiments. However, it will be possible to provide the wheel hub according to the invention in other embodiments than those shown. It will further be possible to use other resilient elements than a rubber member and a turning spring such as illustrated. The hubs illustrated in the embodiments shown are all hubs forming parts of wheels having either a fixed wheel disc, spokes, or a running track for a belt drive or a conveyor belt. The wheel disc may constitute a separate part, which may be mounted on, respectively dismounted from the hub. Thus, it will also be possible to provide wheels that constitute transport rollers, e.g. for conveyor belts, or driving wheels, e.g. for belt drives.

Alternative resilient elements could be hydraulic or pneumatic resilient elements. Alternative resilient elements may be contained in a flexible container so that the resilient character may be adjusted by adding more or less of the fluid or gas contained in the flexible container that contains the hydraulic or pneumatic resilient element. Alternative resilient elements may also be contained in a non-flexible container, e.g. when the resilient element is flexible itself, such as a gas. It will also be possible to combine hydraulic and pneumatic resilient elements, respectively flexible and non-flexible containers.

I claim:

1. A wheel hub with a suspension, said wheel hub being designed to be fastened by one or more fastening elements to a body that is to be relieved of shocks and other pulsating loads, said hub comprising a swivel axle (6) around which a hub body (12) is rotatably seated, a remaining part of a wheel construction being intended to be fastened to said hub body (12), and a resilient element (16) positioned between said fastening elements and said hub body (12), said fastening element extending from a carrier arm (1), and said swivel axle (6) being pivotably secured to the carrier arm (1), being hollow and comprising a swivel bearing (10), and said resilient element (16) being positioned between the carrier arm (1) and the swivel axle (6), wherein the carrier arm (1) comprises a first bearing (5), that the first bearing (5) extends coaxially with the swivel bearing (10) of the swivel axle (6), a bearing pin (11) extends through both the swivel bearing (10) of the swivel axle (6) and the first bearing (5) of the carrier arm (1), the carrier arm (1) forms a fork, the fork comprises at least one fork branch (3), and the fork branch (3) comprises the first bearing (5).

2. A wheel hub according to claim 1, wherein the fork comprises a fork head (4) that extends through the swivel axle (6) within an inner periphery (7) of the swivel axle (6), and the fork head (4) extends between the swivel bearing (10) and a part of the inner periphery (7) in an opposite position relative to the swivel bearing (10).

3. A wheel hub according to claim 1, wherein the resilient element (16) is a rubber member which is positioned between a lowest side (19) of the fork head (4) and a lowest surface (20) on the inner periphery (7) of the swivel axle (6).

4. A wheel hub according to claim 1, wherein the resilient element (16) is a turning spring (21) which has a first end (22) contacting the carrier arm (1) and a second end (23) contacting the inner periphery (7) of the swivel axle (6).

5. A wheel hub according to claim 1, wherein the fork comprises two fork branches (3), the fork comprises a fork head (4), the fork branches (3) extend on opposite sides of the swivel bearing (6), and the fork head (4) extends through the swivel bearing (6) within the inner periphery (7) of the swivel bearing (6) from one fork branch (3) to the other fork branch (3).

6. A wheel hub according to claim 1, wherein the hub body (12) is rotatably seated around the swivel bearing by means of a plain bearing.

7. A wheel hub according to claim 1, wherein a material thickness (t) of the swivel axle (6) is largest around the swivel bearing (10).

8. A wheel hub according to claim 1, wherein the hub body (12) is provided with holes (15) which are intended for the mounting of spokes.

9. A use of a wheel hub according to claim 1, wherein said wheel hub is provided with a single fastening element arranged adjacent to the first side of the swivel axle for use in one-sided fastening to the body to be suspended.

10. A use of a wheel hub according to claim 1, wherein said wheel hub is provided with two fastening elements arranged at the first and the second side, respectively, of the swivel axle for use in two-sided fastening to a body to be suspended.

11. A wheel hub according to claim 6, wherein said plain bearing is a roller bearing.

12. A wheel hub according to claim 11, wherein said roller bearing is a ball bearing.

13. A wheel hub according to claim 6, comprising a plurality of plain bearings setting said hub body around said swivel bearing.

14. A wheel hub according to claim 8, wherein said holes are in a flange of said hub body.

* * * * *

UNITED STATES PATENT AND TRADEMARK OFFICE
CERTIFICATE OF CORRECTION

PATENT NO. : 6,019,435
DATED : February 1, 2000
INVENTOR(S) : Jens Bilgrav BACH

It is certified that error appears in the above-identified patent and that said Letters Patent is hereby corrected as shown below:

On the title page, item

[30] Foreign Application Priority Data

Oct. 23, 1995 [DK] Denmark            1189/95

Signed and Sealed this

Twenty-eighth Day of November, 2000

Attest:

Attesting Officer

Q. TODD DICKINSON

Director of Patents and Trademarks